(12) United States Patent
Sieben et al.

(10) Patent No.: US 9,435,228 B2
(45) Date of Patent: Sep. 6, 2016

(54) AIR COOLING SYSTEM AND METHOD FOR A HEAT RECOVERY STEAM GENERATOR INLET

(71) Applicant: HRST, Inc., Eden Prairie, MN (US)

(72) Inventors: Amy L. Sieben, Forest Lake, MN (US); Bryan F. Craig, Tampa, FL (US)

(73) Assignee: HRST, Inc., Eden Prairie, MN (US)

( * ) Notice: Subject to any disclaimer, the term of this patent is extended or adjusted under 35 U.S.C. 154(b) by 165 days.

(21) Appl. No.: 14/248,887

(22) Filed: Apr. 9, 2014

(65) Prior Publication Data

US 2014/0216001 A1 Aug. 7, 2014

Related U.S. Application Data

(63) Continuation of application No. 13/021,457, filed on Feb. 4, 2011, now abandoned.

(51) Int. Cl.
| | |
|---|---|
| *F02C 1/00* | (2006.01) |
| *F01K 23/10* | (2006.01) |
| *F22B 1/18* | (2006.01) |
| *F22B 35/00* | (2006.01) |
| *F22G 5/12* | (2006.01) |

(52) U.S. Cl.
CPC ............ *F01K 23/101* (2013.01); *F01K 23/10* (2013.01); *F22B 1/1815* (2013.01); *F22B 35/007* (2013.01); *F22G 5/12* (2013.01); *Y02E 20/16* (2013.01)

(58) Field of Classification Search
CPC ....... Y02E 20/16; Y02E 20/14; F01K 23/10; F01K 23/106; F01K 23/101; F02C 7/18; F02C 6/18
See application file for complete search history.

(56) References Cited

U.S. PATENT DOCUMENTS

| | | | | |
|---|---|---|---|---|
| 3,280,551 | A | * 10/1966 | Bracken | F01K 23/101 122/179 |
| 3,934,553 | A | 1/1976 | Freeman, Jr. et al. | |
| 4,555,902 | A | * 12/1985 | Pilarczyk | F01K 27/02 60/39.5 |
| 4,638,630 | A | 1/1987 | Martens et al. | |
| 4,907,406 | A | * 3/1990 | Kirikami | F01K 23/10 60/39.182 |
| 5,579,631 | A | 12/1996 | Chen et al. | |
| 6,173,563 | B1 | 1/2001 | Vakil et al. | |
| 2004/0045300 | A1 | 3/2004 | Dovali-Solis | |
| 2005/0235649 | A1 | 10/2005 | Baer et al. | |
| 2009/0205310 | A1 | 8/2009 | Hibshman, II et al. | |
| 2010/0236241 | A1 | 9/2010 | Kumar et al. | |
| 2011/0000220 | A1* | 1/2011 | Hibshman, II | F01K 23/101 60/783 |
| 2014/0083108 | A1* | 3/2014 | Kunihiro | F01K 23/10 60/772 |

* cited by examiner

*Primary Examiner* — Gerald L Sung
(74) *Attorney, Agent, or Firm* — Vidas, Arrett & Steinkraus, P.A.

(57) ABSTRACT

The air cooling system and method for a heat recovery steam generator (HRSG) inlet provides a combined cycle power plant utilizing a powerful fan coupled to ductwork connected to pipes that enter the HRSG inlet duct coupled to an exhaust duct of a Combustion Turbine (CT) for lowering the temperature of the CT exhaust gas provided to the heat recovery steam generator by the CT. The cool air injection system is utilized during low load operation or startup of the CT to ensure that spray water from an inter-stage desuperheater in an HRSG is fully evaporated prior to entering the downstream superheater or reheater. A feedback system includes temperature elements measuring the mix temperature that regulates the cooling air injection rate into the HRSG inlet.

4 Claims, 13 Drawing Sheets

| FROM | NO. | CONDITION | POINT DESCRIPTION |
|---|---|---|---|
|  | 1 |  |  |
| DISTRIBUTED CONTROL SYSTEM | 2 | ENABLE | INLET INJECTION AIR SYSTEM |
| DISTRIBUTED CONTROL SYSTEM | 3 | ENABLE | COMBUSTION TURBINE START - RUN |
| MW SETPOINT | 4 | >20% | COMBUSTION TURBINE MEGAWATT SET POINT |
|  | 5 |  |  |
| DISTRIBUTED CONTROL SYSTEM | 6 | >20% | COMBUSTION TURBINE MEGAWATT SET POINT |
|  | 7 |  |  |
| DISTRIBUTED CONTROL SYSTEM | 8 | >1100F | HEAT RECOVERY STEAM GENERATOR DUCT TEMP |
|  | 9 |  |  |
| DISTRIBUTED CONTROL SYSTEM | 10 | AUTO | AUTO/MANUAL SELECT |
| DISTRIBUTED CONTROL SYSTEM | 11 | STOP | BLOWER STOP COMMAND |
| DISTRIBUTED CONTROL SYSTEM | 12 | START | BLOWER START COMMAND |
|  | 13 |  |  |
|  | 14 |  |  |
|  | 15 |  |  |
|  | 16 |  |  |
| DISTRIBUTED CONTROL SYSTEM | 17 | AUTO | AUTO/MANUAL SELECT |
| DISTRIBUTED CONTROL SYSTEM | 18 | OPEN | OPEN/CLOSE SELECT ISOLATION DAMPER |
|  | 19 |  |  |
| DISTRIBUTED CONTROL SYSTEM | 20 | OPEN | OPEN LIMIT SWITCH |
|  | 21 |  |  |
| DISTRIBUTED CONTROL SYSTEM | 22 | CLOSED | CLOSED LIMIT SWITCH |
|  | 23 |  |  |
|  | 24 |  |  |
|  | 25 |  |  |
|  | 26 |  |  |
|  | 27 |  |  |
|  | 28 |  |  |
|  | 29 |  |  |
| DISTRIBUTED CONTROL SYSTEM | 30 | HIGH | HIGH COOLING AIR DUCT TEMP |

| POINT DESCRIPTION | STATUS | NO. | TO |
|---|---|---|---|
| | | 1 | |
| | | 2 | |
| COOLING AIR SYSTEM | ENABLED | 3 | INDICATOR |
| | | 4 | |
| COOLING AIR BLOWER SPEED | 100% | 5 | |
| | | 6 | |
| COOLING AIR BLOWER SPEED RAMP DOWN | RAMP DOWN ENABLED | 7 | |
| | | 8 | |
| | | 9 | |
| COOLING AIR BLOWER | RUN | 10 | |
| | | 11 | |
| | | 12 | |
| TRANSFER LEAD TEMP CONTROL | COOLING AIR BLOWER | 13 | |
| | | 14 | |
| OPEN ISOLATION DAMPER | OPEN | 15 | |
| | | 16 | |
| | | 17 | |
| DAMPER FAILED TO OPEN | FAIL | 18 | ALARM |
| | | 19 | |
| ISOLATION DAMPER OPEN | OPEN | 20 | INDICATE |
| | | 21 | |
| DAMPER FAILED TO OPEN | FAIL | 22 | ALARM |
| | | 23 | |
| ISOLATION DAMPER CLOSED | CLOSED | 24 | INDICATE |
| | | 25 | |
| | | 26 | |
| SEAL AIR BLOWER | SEE SHEET 2 | 27 | |
| | | 28 | |
| | | 29 | |
| HIGH COOLING AIR DUCT TEMP | ALARM | 30 | ALARM |

| FROM | NO. | CONDITION | POINT DESCRIPTION |
|---|---|---|---|
|  | 1 |  |  |
|  | 2 |  |  |
|  | 3 |  |  |
|  | 4 |  |  |
|  | 5 | RUN | SEAL AIR BLOWER |
| DISTRIBUTED CONTROL SYSTEM | 6 | BLOWER "A" | SEAL AIR BLOWER SELECT |
|  | 7 |  |  |
|  | 8 |  |  |
|  | 9 |  |  |
|  | 10 |  |  |
| DISTRIBUTED CONTROL SYSTEM | 11 | AUTO | AUTO/MANUAL SELECT |
| DISTRIBUTED CONTROL SYSTEM | 12 | STOP | SEAL BLOWER STOP COMMAND |
| DISTRIBUTED CONTROL SYSTEM | 13 | START | SEAL BLOWER START COMMAND |
|  | 14 |  |  |
|  | 15 |  |  |
|  | 16 |  |  |
|  | 17 |  |  |
|  | 18 |  |  |
|  | 19 |  |  |
| DISTRIBUTED CONTROL SYSTEM | 20 | AUTO | AUTO/MANUAL SELECT |
| DISTRIBUTED CONTROL SYSTEM | 21 | STOP | SEAL BLOWER STOP COMMAND |
| DISTRIBUTED CONTROL SYSTEM | 22 | START | SEAL BLOWER START COMMAND |
|  | 23 |  |  |
|  | 24 |  |  |
|  | 25 |  |  |
|  | 26 |  |  |
|  | 27 |  |  |
|  | 28 |  |  |
|  | 29 | LOW | SEAL AIR PRESSURE LOW |
|  | 30 |  |  |

| POINT DESCRIPTION | STATUS | NO. | TO |
|---|---|---|---|
| | | 1 | |
| | | 2 | |
| | | 3 | |
| | | 4 | |
| | | 5 | |
| | | 6 | |
| | | 7 | |
| | | 8 | |
| | | 9 | |
| | | 10 | |
| | | 11 | |
| SEAL AIR BLOWER "A" | RUN | 12 | |
| | | 13 | |
| | | 14 | |
| | | 15 | |
| | | 16 | |
| | | 17 | |
| | | 18 | |
| | | 19 | |
| | | 20 | |
| SEAL AIR BLOWER "B" | RUN | 21 | |
| | | 22 | |
| | | 23 | |
| | | 24 | |
| | | 25 | |
| | | 26 | |
| | | 27 | |
| SEAL AIR PRESSURE LOW | ALARM | 28 | ALARM |
| | | 29 | |
| | | 30 | |

AIR COOLING SYSTEM AND METHOD FOR A HEAT RECOVERY STEAM GENERATOR INLET

BACKGROUND OF THE INVENTION

1. Field of the Invention

The present invention relates generally to cooling systems for steam generators used in power plants and the like, and particularly to an air cooling system and method for a heat recovery steam generator inlet that provides temperature reduction control for a heat recovery steam generator (HRSG) air inlet to mitigate overspray during an inter-stage cooling procedure performed in a desuperheater.

2. Description of the Related Art

Combined cycle and cogeneration are processes that use the exhaust heat discharged from a Combustion Turbine (CT) to provide heat to a boiler, which, in turn, makes steam to power a Steam Turbine (ST). A heat recovery steam generator (HRSG) is a boiler that has an inlet coupled to an exhaust of a CT engine or other heat source and typically includes an inter-stage desuperheater.

Desuperheater overspray is a term used to describe a condition where spray water from an inter-stage desuperheater in an HRSG is not fully evaporated prior to entering the downstream superheater or reheater and associated piping.

Water quenching from desuperheater overspray has caused a number of superheater and reheater tube failures in HRSGs. Piping damage has also occurred at some plants, due to un-evaporated spray water quenching the pipe wall.

This problem is particularly prevalent in HRSGs behind large CTs where exhaust gas temperature reaches a peak of 1200° F. when operating at low load or during startup. This operating condition is challenging from a superheater or desuperheater design perspective, as it results in a combination of low steam flow and high spray water flow, which yields a high likelihood of desuperheater overspray. While many systems use water injection to cool the turbine exhaust, such cooling results in thermal fatigue damage (quench) to non-pressure parts in the inlet duct, wastes expensive treated boiler water that cannot be recovered, and is insufficient to accomplish cooling of the turbine exhaust gas without additional overspray in the desuperheaters.

Thus, an air cooling system and method for a heat recovery steam generator (HRSG) inlet solving the aforementioned problems is desired.

SUMMARY OF THE INVENTION

The air cooling system and method for a heat recovery steam generator inlet includes a powerful fan coupled to ductwork connected to pipes or ducts that enter the exhaust duct of a Combustion Turbine (CT) for lowering the temperature of the CT exhaust gas provided to the heat recovery steam generator by the CT. The cool air injection system is utilized during low load operation of the CT to ensure that spray water from an inter-stage desuperheater in the HRSG is minimized so that it is not calling for spraying to within 50° F. of saturation prior to entering the downstream superheater or reheater. This eliminates the damaging thermal fatigue cycle in the downstream pressure retaining components of the HRSG.

A plant's existing control system includes a desuperheater cooling water flow control valve, and a HP SH (high-pressure superheater), as well as a RH (reheat) steam outlet temperature element that regulates each via a feedback loop. The cooling air injection rate into the HRSG inlet is controlled by a variable frequency drive taking its set point from the mixed gas temperature measurement near the tube face. The existing control logic is not altered, and the novel air cooling system is added as a completely independent 'plug and play' system. Minor additions to the plant's control system are implemented for control of this system. Many plants spend significant time operating at minimum CT load. This minimum load operation results in very high exhaust temperatures, which may also cause overspray in the HRSG's desuperheater. Plants that suffer desuperheater overspray problems or thermal fatigue damage of non-pressure parts (such as gas baffles, liner systems, and tube ties) in the inlet duct from the CT to the HRSG benefit from the system and method disclosed herein.

The system and method disclosed herein reduce the peak gas temperature, thereby protecting the plant equipment. The system and method has successfully mitigated overspray in a GE 7FA turbine combined cycle system, where unchecked exhaust temperature reaches a peak of 1200° F. at low flow. The system and method are theorized to work with any constant temperature CT or other direct fired heat source.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Desuperheater overspray is a term used to describe a condition where spray water from an inter-stage desuperheater in a heat recovery steam generator (HRSG) is not fully evaporated prior to entering the downstream superheater or reheater.

Water quenching from desuperheater overspray has caused a number of superheater and reheater tube failures in HRSGs. Piping damage has also occurred at some plants, due to unevaporated spray water quenching the pipe wall.

The problem is most likely to occur when turbine exhaust gas temperature reaches a peak of 1200° F. when operating at low load or start up, a frequent and unavoidably encountered operating condition. This operating point yields low steam flow combined with high spray water flow, resulting in the desuperheater spraying to saturation in order to maintain the outlet steam temperature.

Plants suffering desuperheater overspray problems have had limited options with minimal success, such as making control changes or equipment modifications to prevent tube and/or piping failures from occurring. This is due to a fundamental mismatch in the heat source and the heat recovery surface area during startup or low load conditions.

Figure 1:
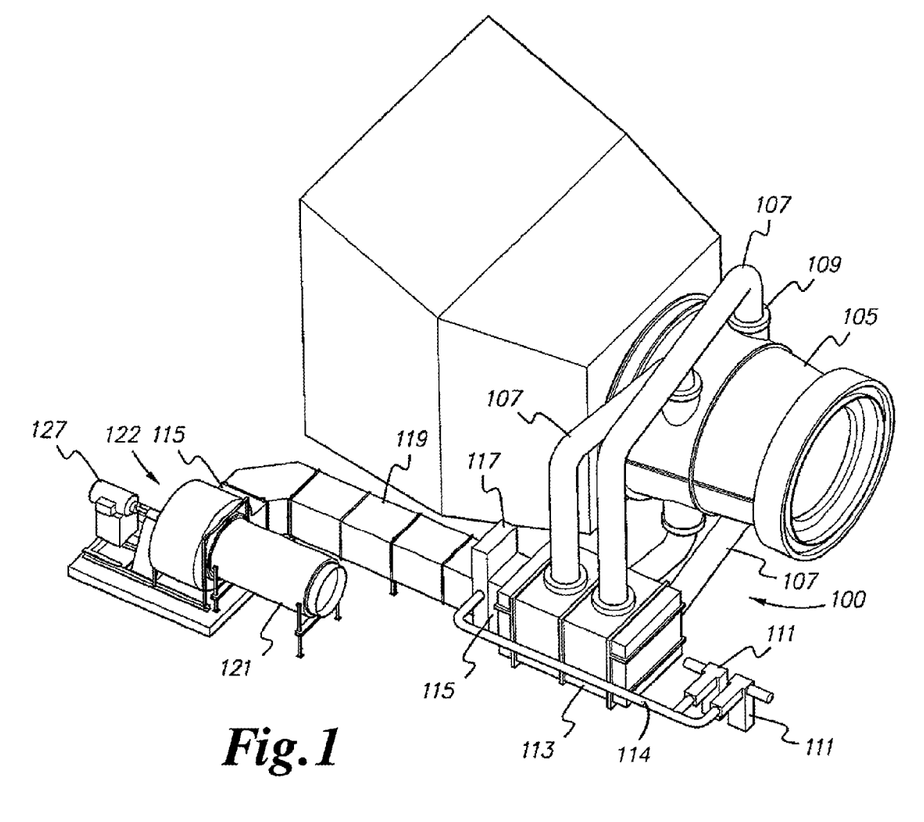
FIG. 1 is a perspective view showing a general arrangement of an air cooling system for an HRSG inlet according to the present invention.
Figure 2A:
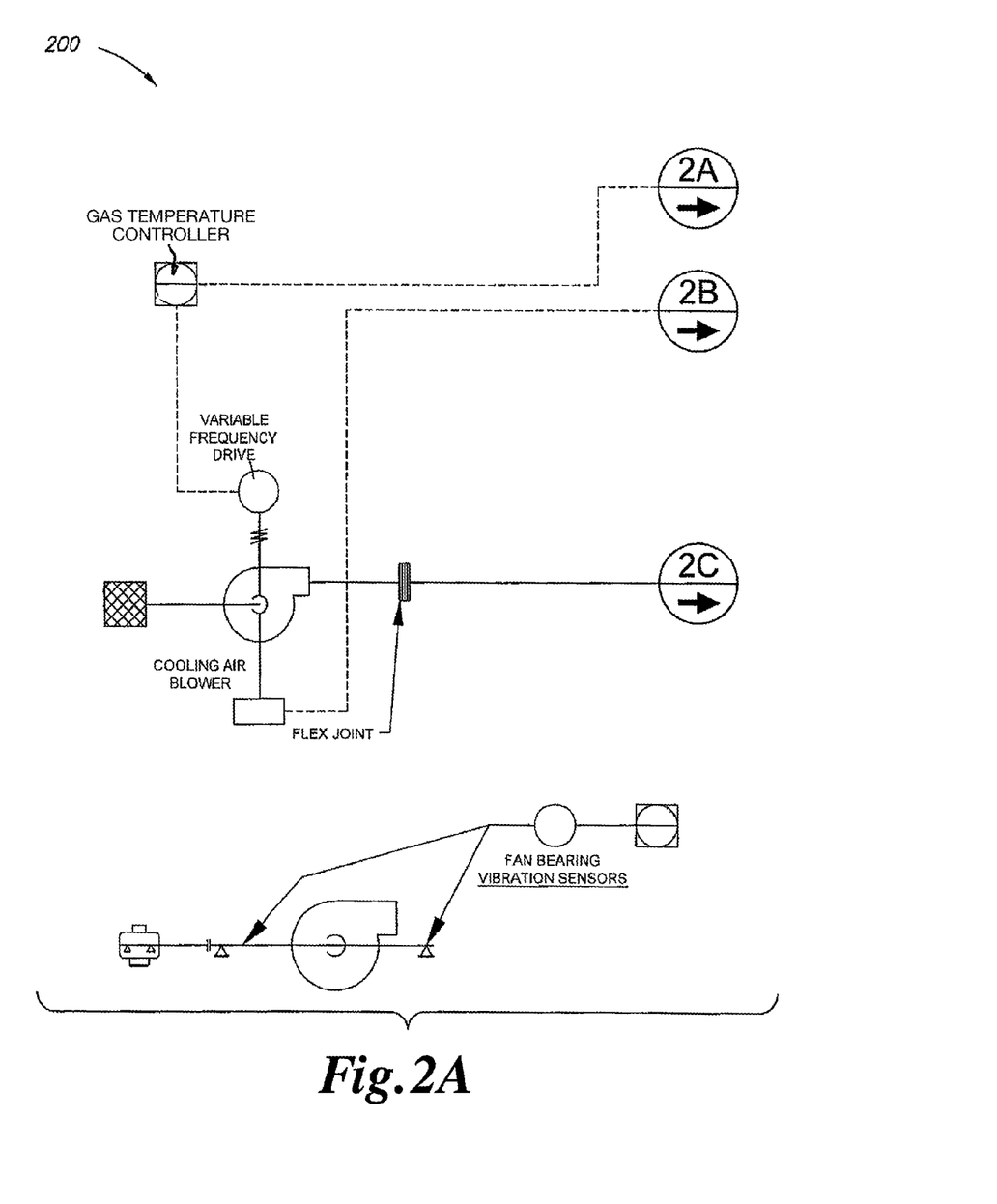
FIGS. 2A, 2B, and 2C show a schematic diagram of piping and instruments for a component control circuit of the air cooling system for an HRSG inlet according to the present invention.
Figure 2B:
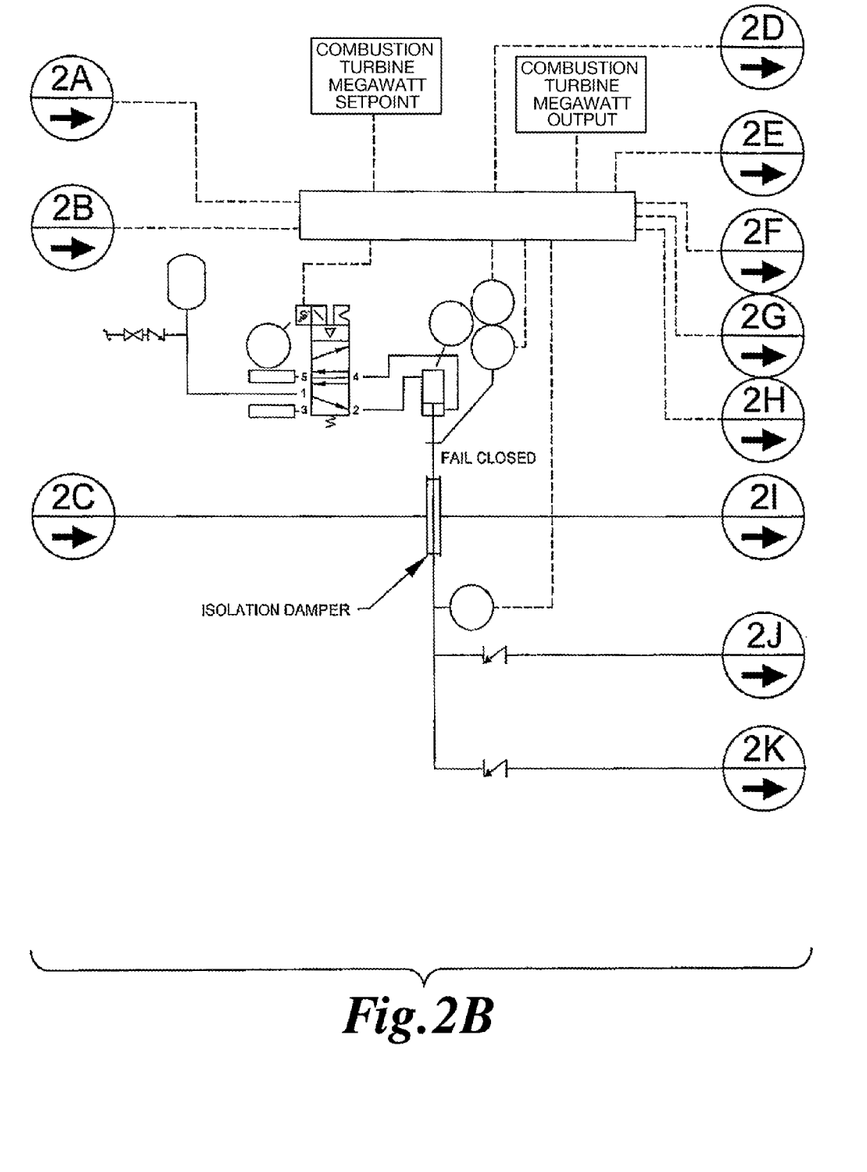
Figure 2C:
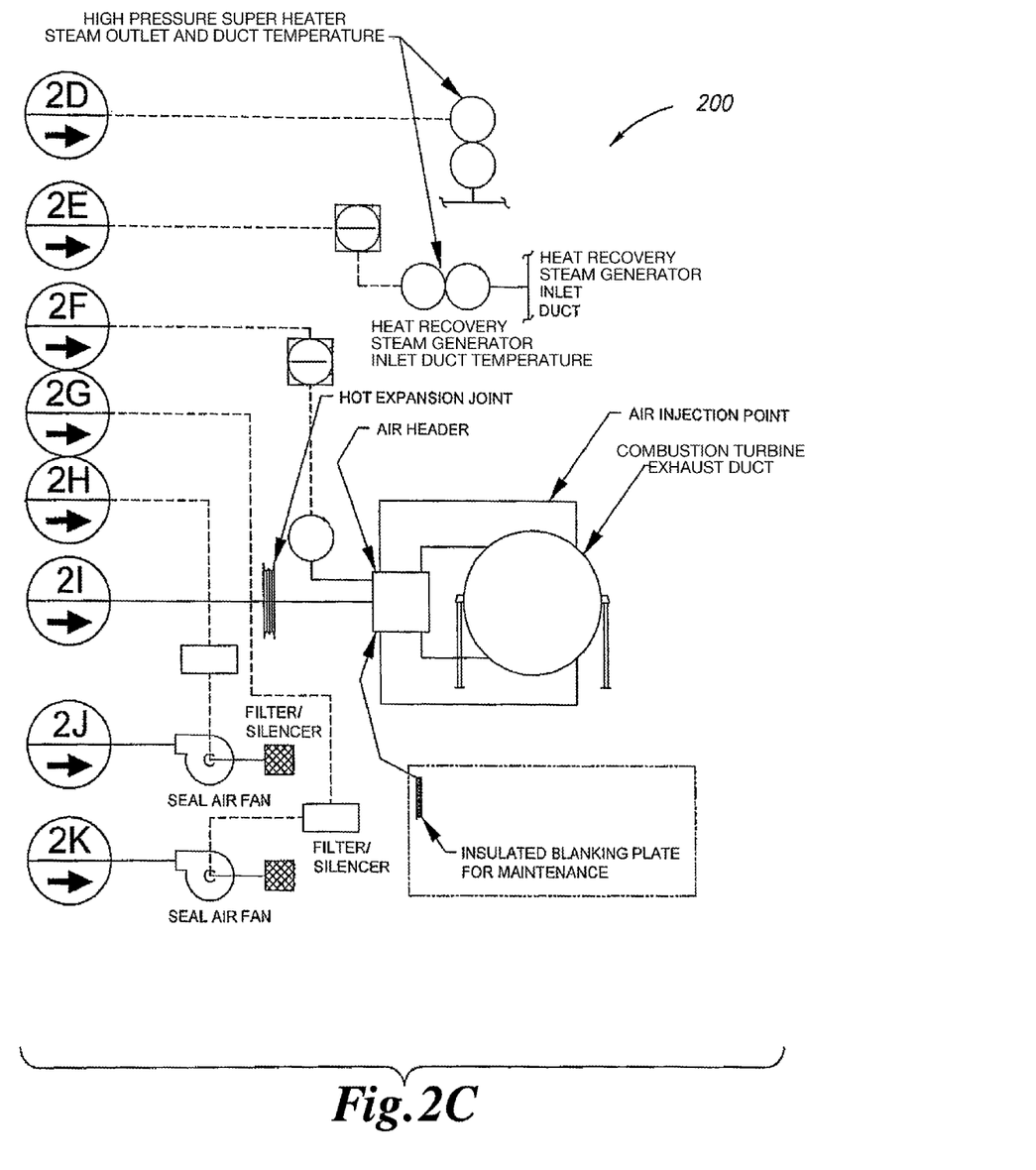

Based on analysis performed by the present inventors, desuperheater overspray can be prevented by reducing the turbine exhaust gas temperature between 50 and 100° F., depending on the severity of the overspray. As shown in FIG. 1, the air cooling system 100 includes a variable frequency drive (VFD) motor 127 driving a powerful fan 122 coupled to ductwork 119 extending into an insulated duct 113 connected to pipes (or alternatively duct work) 107 that extend to and couple (with the aid of mechanical penetration seals 109) to an HRSG air inlet 105, the air inlet 105 being connectable to an exhaust duct of a CT. This arrangement forces ambient air into inlet 105 for lowering the temperature of the CT exhaust gas provided to the heat recovery steam generator by the CT. The intake of the powerful blower 122 may also be connected to a silencer 121 for quieter operations.

Due to expected cooling and heating cycles within the ductwork, a plurality of expansion joints 115 may be provided to interconnect sections of ductwork. To prevent backflow of CT exhaust gases when the powerful blower 122 is off, a seal damper 117 is disposed between the airflow duct 119 and the insulated duct 113. The seal damper 117 raises and lowers on command from the existing plant distributed control system. The seal air fans 111, being connected to the damper 117 via a seal air pipe 114, provide the necessary pressure to aid in prevention positive seal at the damper. The air cooling system 100 is utilized during low load operation, including startup of the CT to ensure that spray water from an inter-stage desuperheater in the HRSG is fully evaporated prior to entering the downstream superheater or reheater. An existing control system includes a desuperheater cooling water flow control valve, and an HP SH (high-pressure superheater), as well as an RH (reheat) steam outlet temperature element that regulates each through a feedback loop. The cooling air injection rate into the HRSG inlet is controlled by a variable frequency drive taking its set point from the mixed gas temperature measurement near the tube face. The existing control logic is not altered, and this system is added as a 'plug and play' system completely independent. Minor additions to the plant's distributed control system are implemented for control of this system. The system 100 may be designed into a new plant or incorporated into an existing plant as a 'plug-n-play' option.

Figure 4A:
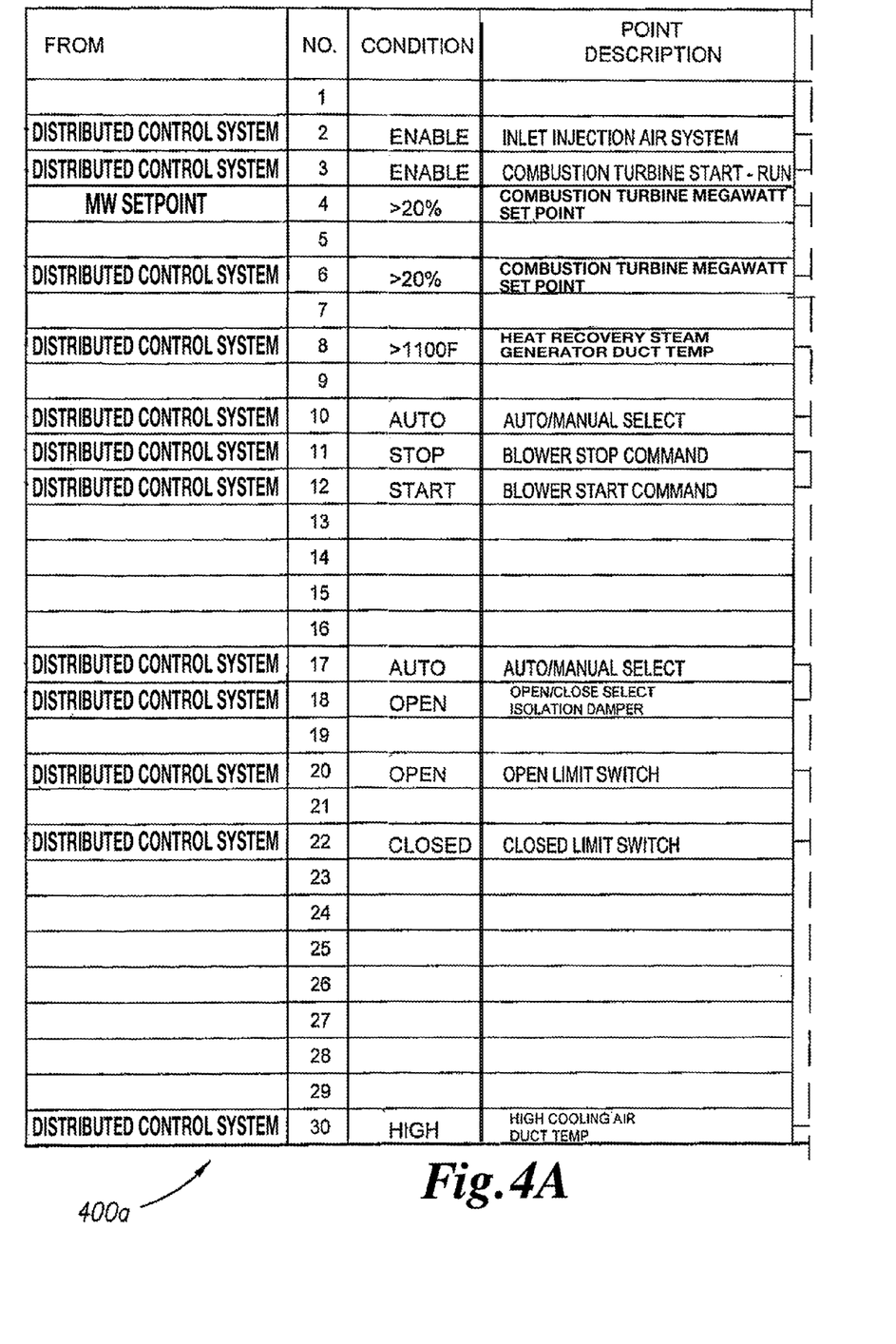
FIGS. 4A, 4B and 4C show a schematic diagram showing logic flow of a digital electronic timing and control circuit of the air cooling system for an HRSG inlet according to the present invention.
Figure 4B:
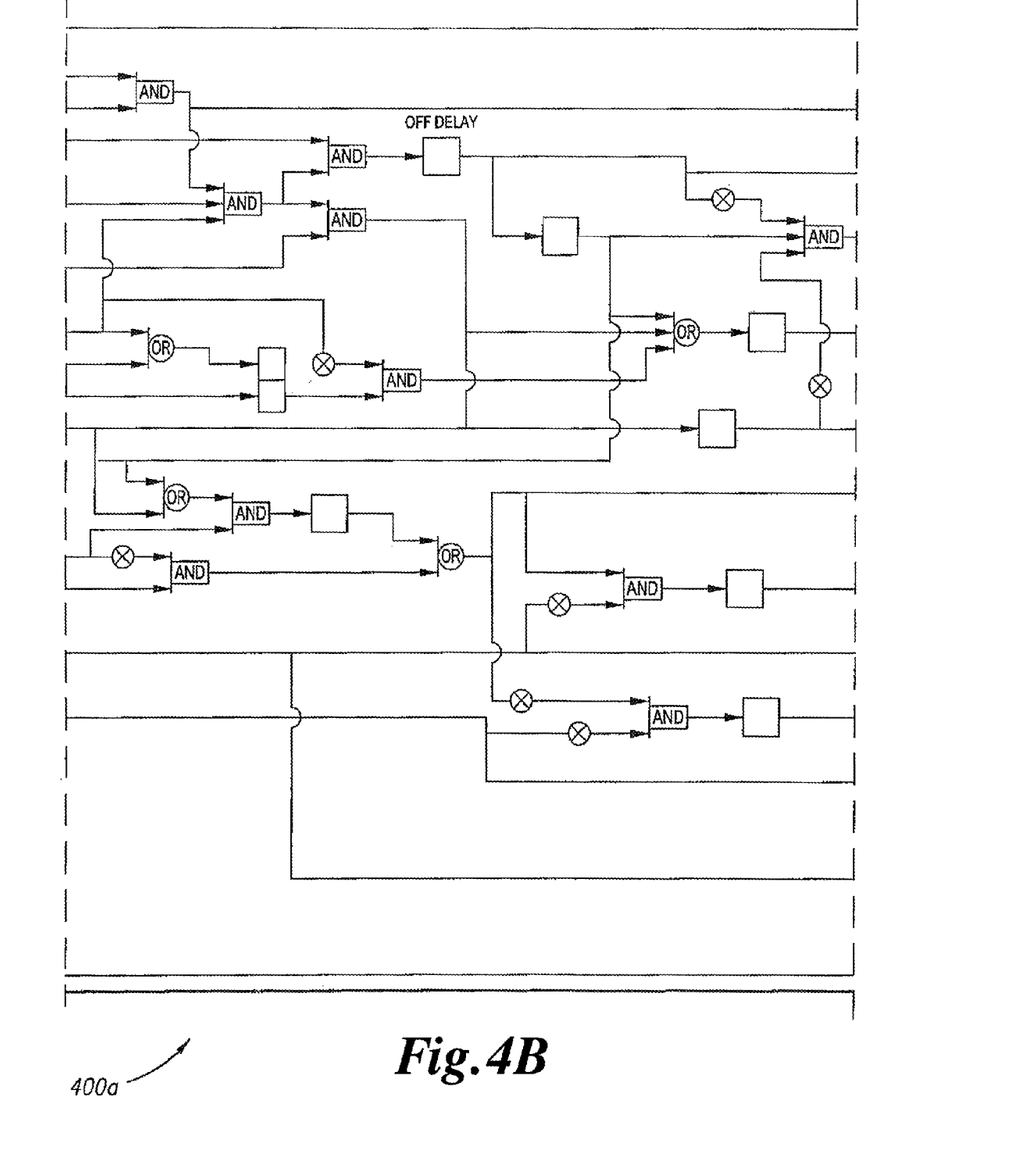
Figure 4C:
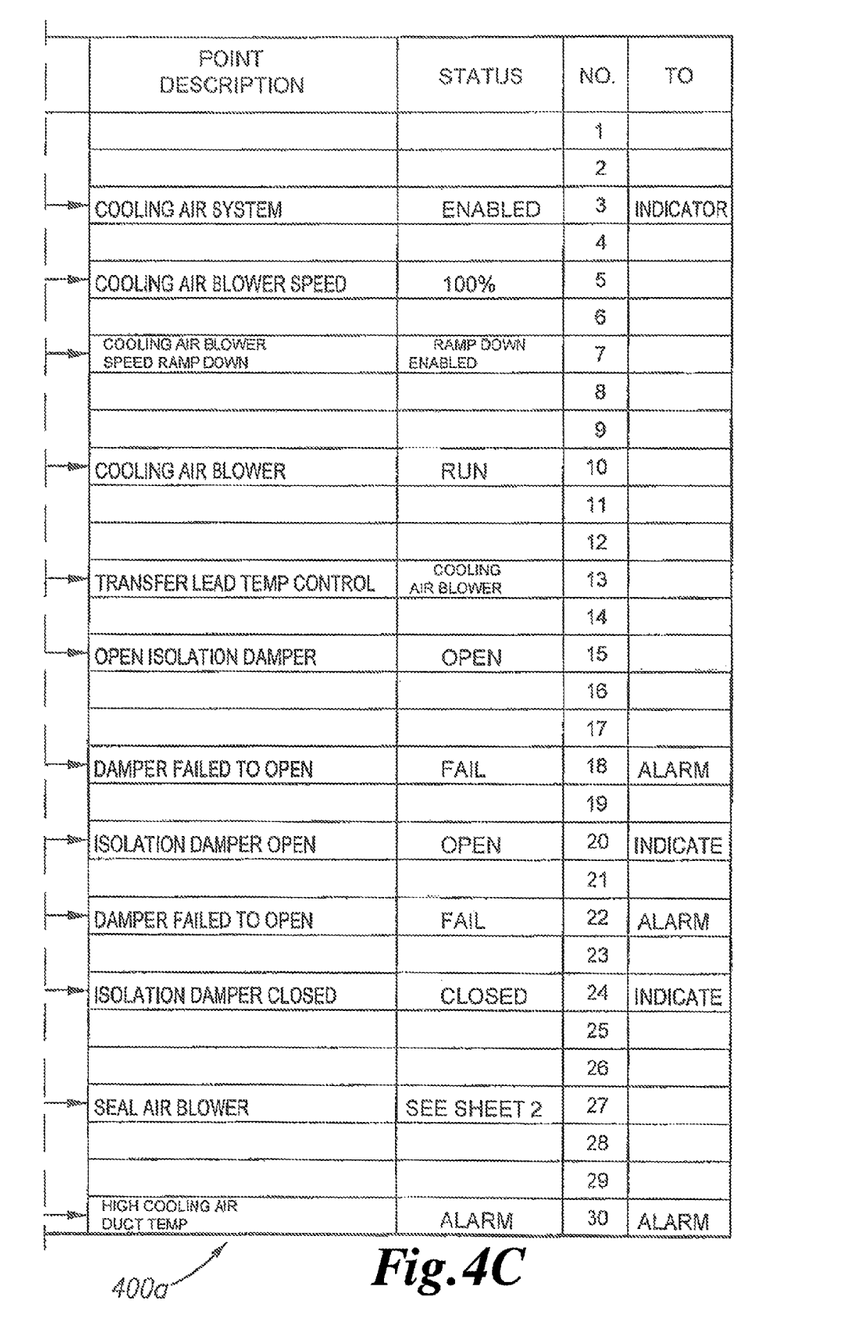

As shown in FIGS. 4A-4C, the air cooling system involves electronic control and timing circuit 400a, which initiates a first start sequence when the CT output in megawatts (MW) is greater than 20% and the set point is increasing.

Figure 5A:
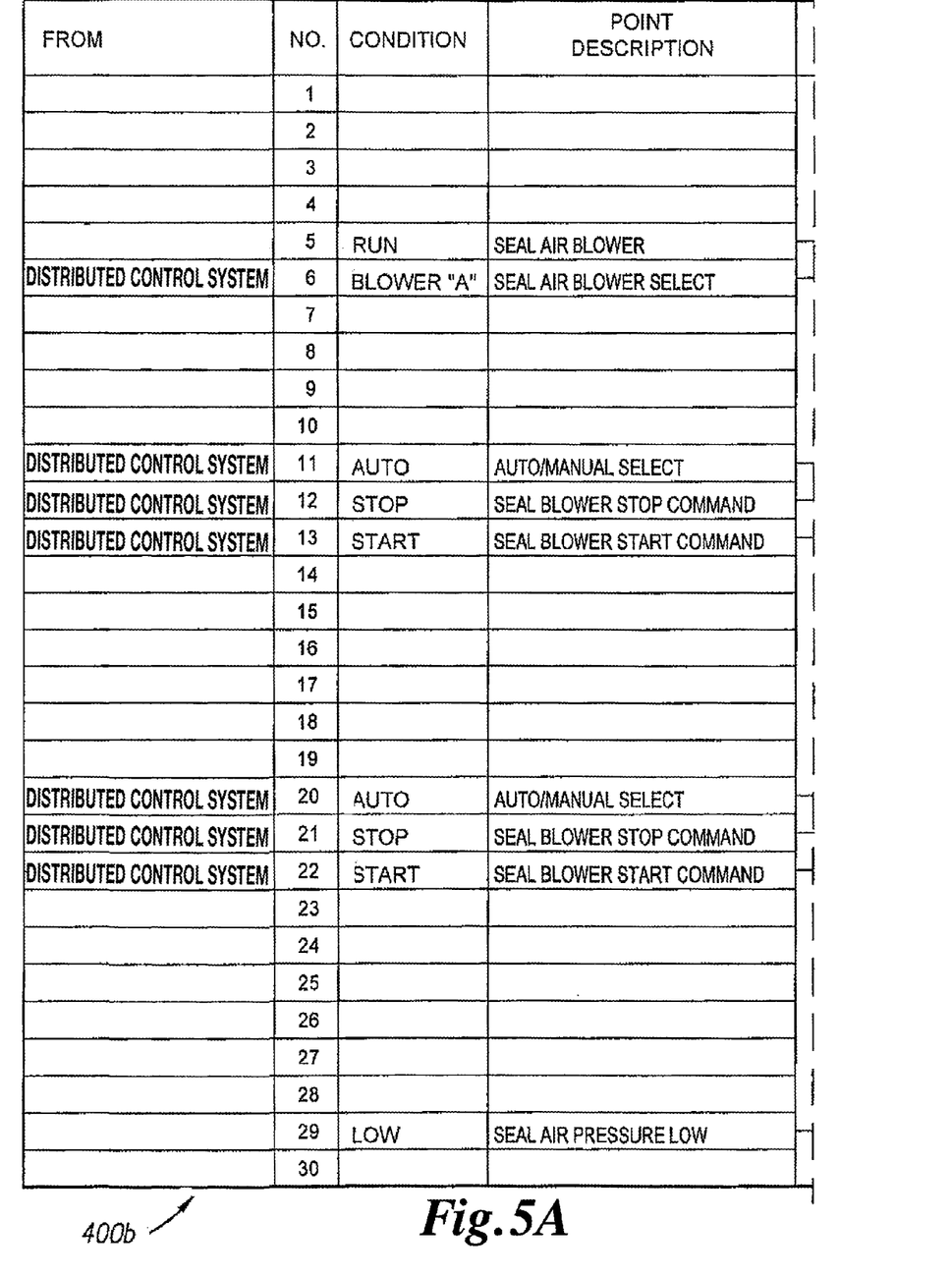
FIGS. 5A, 5B and 5C show a schematic diagram showing logic flow for seal air control electronic circuitry of the air cooling system for an HRSG inlet according to the present invention.
Figure 5B:
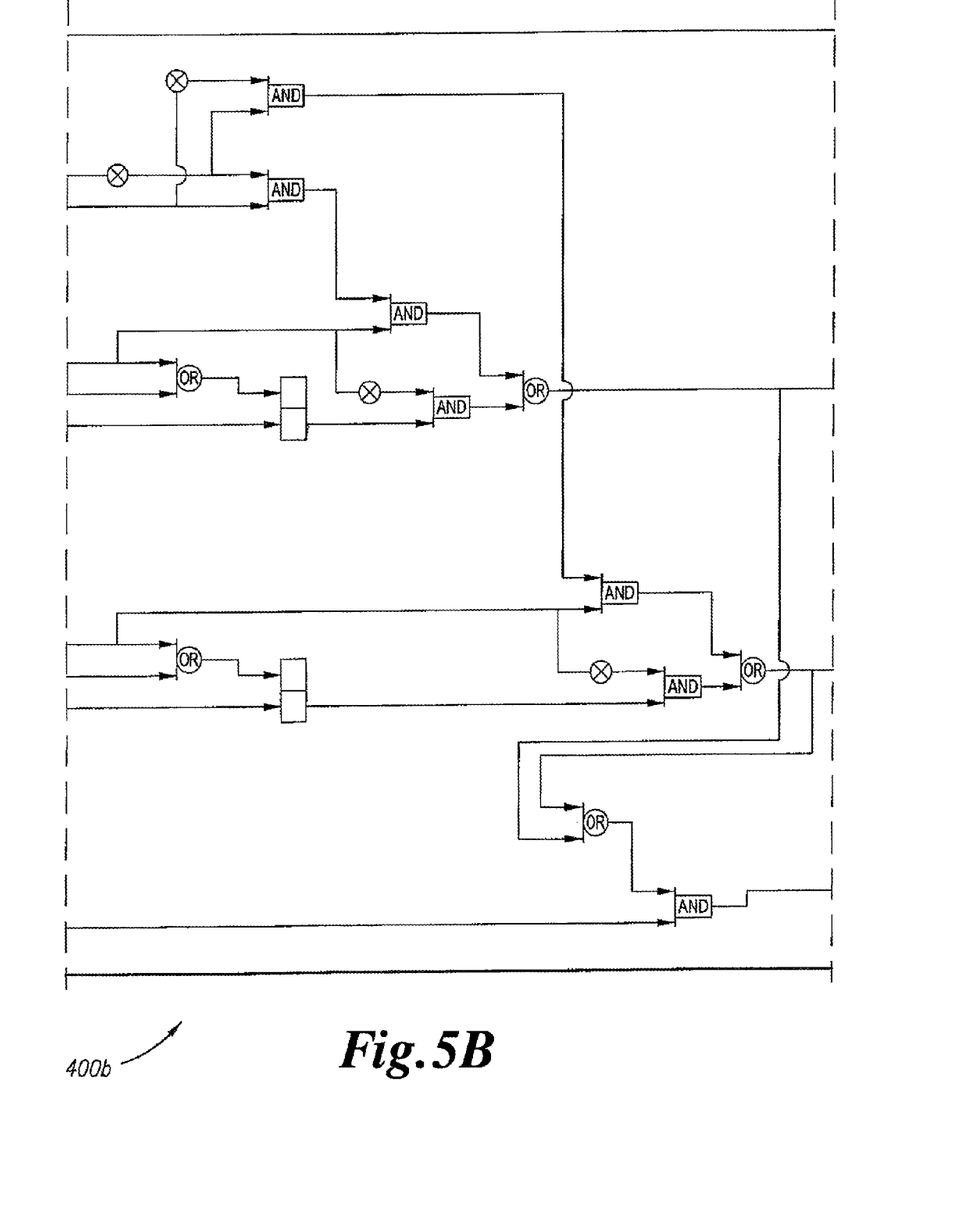
Figure 5C:
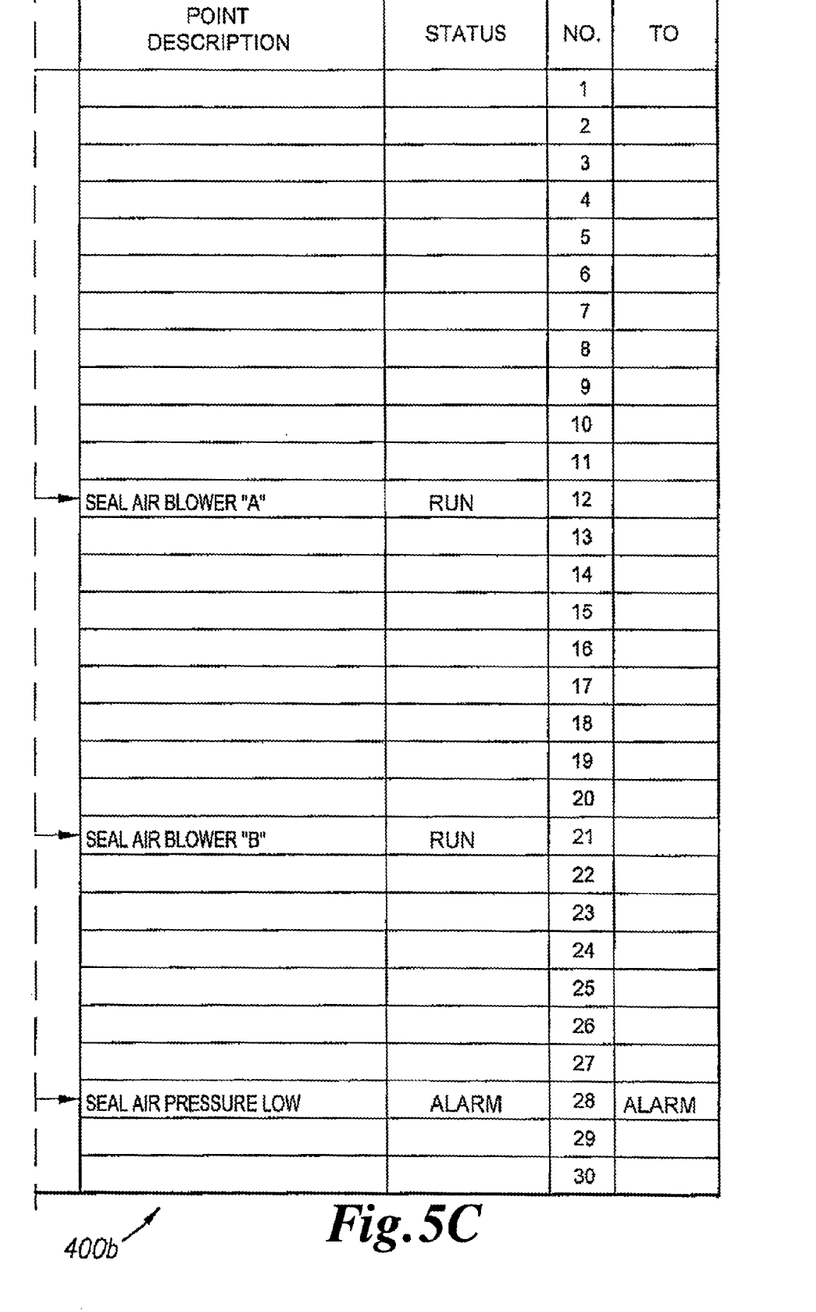

During the start sequence the manual or auto selectable cooling air blower 122 starts, based on a signal sent by the electronic control circuit 400a. Additionally, the electronic control circuit 400a limits blower speed to 100%. Moreover, the circuit 400a commands the isolation damper 117 to open after a delay for the fan to spin up to minimum speed. As shown in FIGS. 5A-5C, a seal air pressure switch, timing and control circuit 400b stops the seal air blower when the isolation damper 117 is full open.

The control circuit 400a issues logic signals, which control cooling air blower 122. A seal air timing, control and alarm circuit 400b controls the isolation damper 117 and the damper seal air fans 111. Moreover, the control circuit 400a includes input circuitry that allows operation to be enabled by a user (operator) in conjunction with an indicated start-run signal issued by the CT and the manual or auto selectable cooling air blower 122 set to auto. Additionally, the electronic control circuit 400a allows for the start sequence to be initiated when the cooling air blower is started, e.g., manually, irrespective of CT MW setpoint.

In the stop sequence, the control circuit 400a delays stop initiation in order to take the time to close the damper. Then the control circuit 400b commands the seal air blower 111 to start. Subsequently, the control circuit 400a disables 100% blower speed and sends a signal that enables a blower speed ramp down (ramp rate control is shown in function diagram 300 of FIG. 3B).

The electronic control and timing circuit 400a and the seal air alarm, timing and control circuit 400b initiate a second sequence when the CT MW output is less than 80% and the HRSG inlet duct temperature is greater than the steam temperature plus 50° F. It should be understood that the electronic control circuits 400a and 400b are exemplary, and one having ordinary skill in the art could utilize a variety of different options, including, e.g., programmable logic arrays, field programmable gate arrays, microprocessor controllers, and the like.

As shown in the control block and schematic diagrams 200 of FIGS. 2A-2C, 4A-4C, and 5A-5C, the second start sequence, which is controlled by the electronic control and timing circuit 400a and the seal air alarm, timing and control circuit 400b, comprises the steps of starting the cooling air blower 122; commanding the isolation damper 117 to open after a one-minute delay; commanding the seal air blower 111 to stop when the isolation damper 117 is full open thereby controlling the HP SH temperature with the cooling air blower. The water desuperheater's existing logic remains intact, but does not call for excessive spray to saturation as there is very little water needed to maintain steam temperature.

Via command signals from control circuits 400a and 400b, the system 100 provides a corresponding stop sequence that begins responsive to the CT MW being greater than 80% or the HRSG inlet duct temperature being less than the steam set point plus 50° F., the stop sequence comprising the steps of: commanding the isolation damper 117 to initiate a closing sequence, commanding the seal air blower to start, and commanding the cooling air blower 122 to stop after a delay.

When the isolation damper 117 is fully closed, the system 100 causes changeover sequence number one to transition to changeover sequence number two.

The system 100 commands a changeover from sequence one to two responsive to CT MW output remaining below 80% and the temperature inside HRSG duct 105 going above the steam set point plus 50° F. anytime during sequence one. For example, when the aforementioned power and temperature readings have been sensed by the system 100, the lead temperature control transfers to cooling air mode after a delay, the blower speed minimum is enabled, and the system 100 resumes control of the HP SH temperature.

The system 100, and more specifically, the seal air alarm, timing and control circuit 400b, has alarms that are actuated if the isolation damper fails to open in a predetermined allotted time, if the isolation damper fails to close in a predetermined allotted time, if the high cooling air duct temperature indicates turbine exhaust gas (TEG) flow back toward cooling air blower, or if seal air blower pressure is low.

Figure 3A:
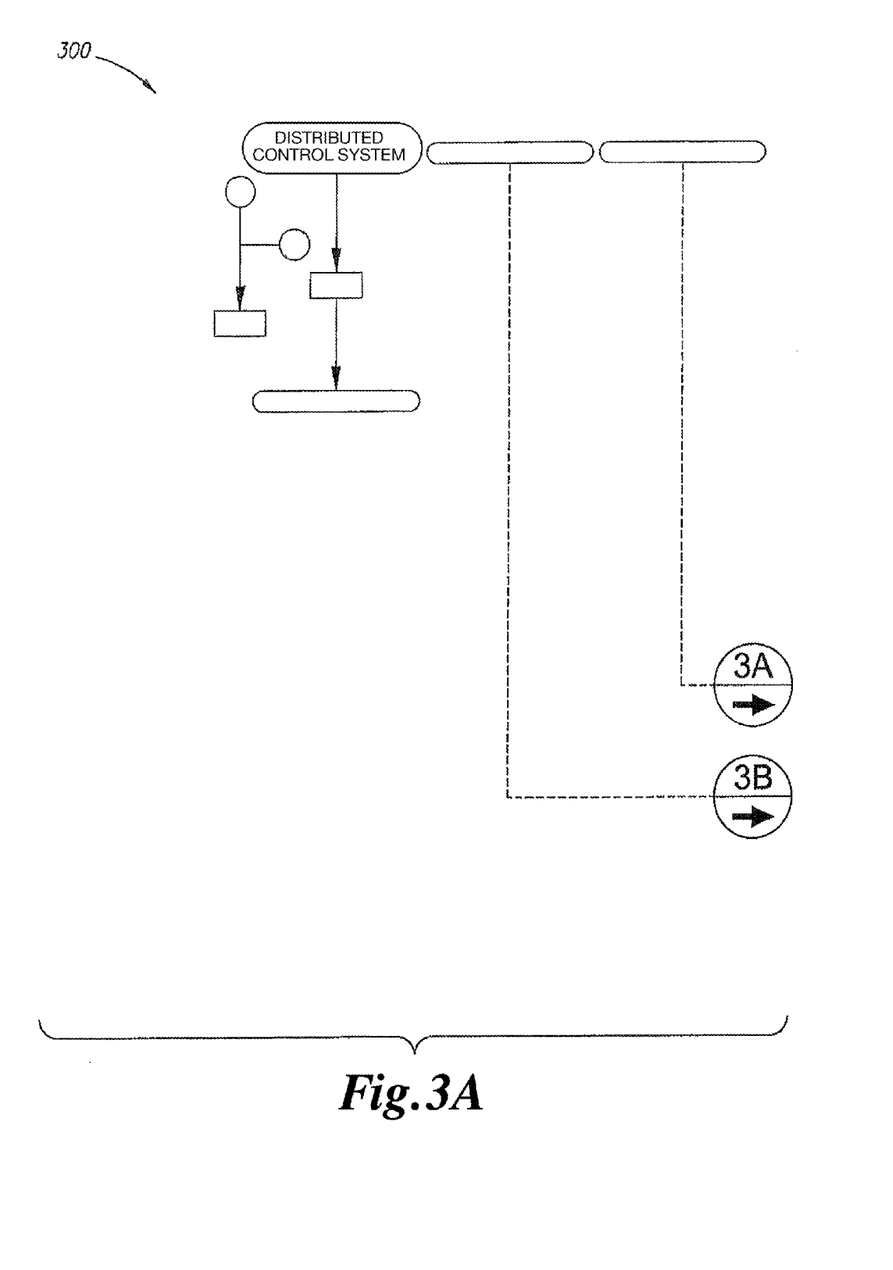
FIGS. 3A and 3B show a block diagram of the control circuit of the air cooling system for an HRSG inlet according to the present invention.
Figure 3B:
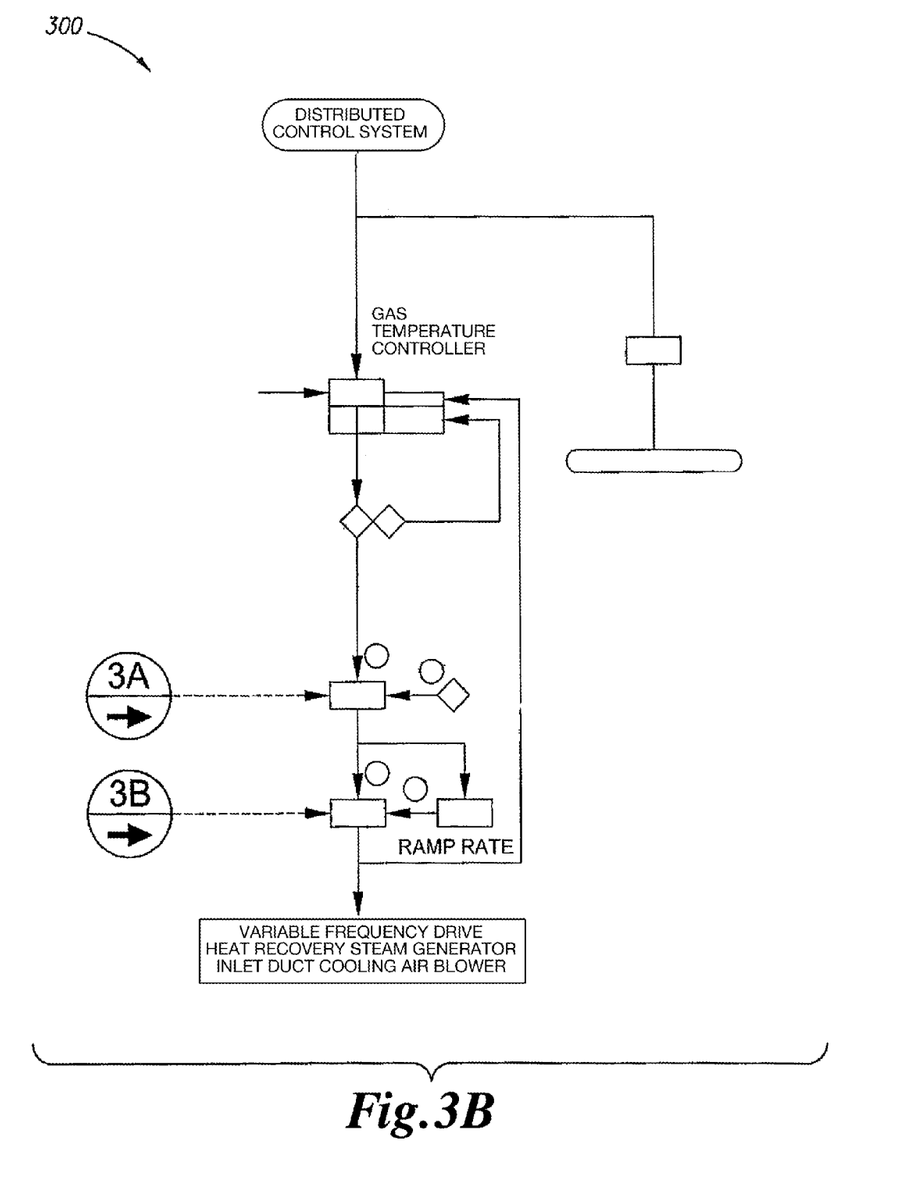
Figure 6:
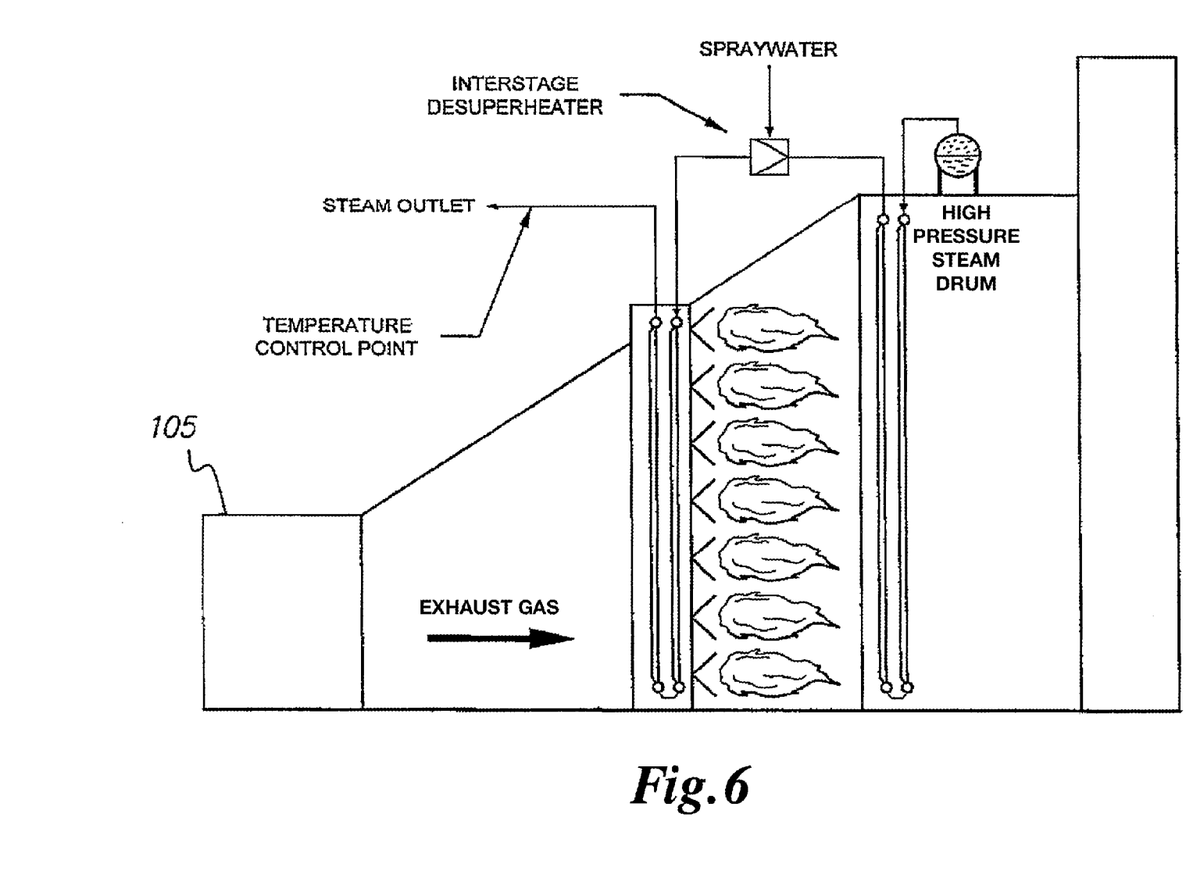
FIG. 6 is a block diagram showing configuration of a simplified HRSG and the inter-stage desuperheater.

The system utilizes a pre-existing high-pressure superheater (HP SH) temperature controller which controls the desuperheater cooling water flow, and, as shown in block function diagram 300 of FIG. 3B, a gas temperature controller (the TIC-005), which controls the cooling air blower. The desuperheater and its cooling water flow temperature control point are diagrammatically shown in FIG. 6.

With reference to point descriptions of circuit 400a in FIG. 4C, if the input at H-9 goes high, the lead controller will change from desuperheater cooling water to blower cooling air. If the input at H-10 goes high, the cooling air blower will go to 100%. If the input at H-12 goes high, the cooling air blower speed will ramp down.

The system 100 may be used in conjunction with commercially available turbine control modifications to further enhance overspray mitigation at the facility. Moreover, the system performs best in a combined cycle application having waste boilers, where the surface area layout causes the attemperators to spray to saturation. For example, the system is particularly useful in the GE 'F' Class turbines, where there is a temperature spike to 1200° F. from 30-70% loads with varying degrees of reduced full load mass flow. Additionally, many newly designed HRSGs include features where the split of the surface arranged for the duct burner emphasizes the overspray issue and causes significant problems, which the system and method are designed to address.

The CT can be operated at low load with no modification to the turbine controls or equipment. This system can also be used with other heat sources, such as a fired kiln. When the heat source is incongruous with the designed surface area of the HRSG it causes attemperator overspray. The additional ambient air added by the air cooling system 100 prevents overspray in the attemperators. This prevents cracking of the main steam piping downstream and tube failures that previously were a result of spraying to saturation (no residual superheat in the steam) and the subsequent thermal fatigue. The system 100 adds ambient air to the HRSG to keep the non-pressure components in the HRSG inlet duct, such as tube ties, liner plate, and flow distribution devices, from creep and oxidation damage during extended duration at low load and high temperature. The system, thus, affords protection of the HRSG from thermal fatigue and oxidation damage.

Since the fan is preferably operated with a variable frequency drive (VFD) motor 127, the exact output is between two flows, depending on backpressure from the main heat source (CT exhaust in the exemplary case). The VFD 127 has been integrated into the system 100 to optimize air addition. However, the system may also be effectively used without a VFD due to small variation in fan flow in comparison to heat source flow from the CT. Thus, the system focuses on reducing the overall bulk temperature to the HRSG. Computational Fluid Dynamics (CFD) analysis has also been done to prove that the resultant temperature distribution is satisfactory. The system 100 focuses on conventional type HRSGs with vertical tubes and separate superheater, evaporator, and economizer tube bundles, but is applicable to other boilers.

The system 100 does not have a negative impact on the emissions from the HRSG exhaust stack on a pound-per-hour basis, since the addition of ambient air is the only change to the gas stream. There are no changes necessary to CT or steam turbine controls or components of the combined cycle system during startup or low load operation.

The system 100 combines controlling desuperheater water sprays and the percent of dilution air to the exhaust gas stream to maintain a constant temperature to the HRSG so that the inter-stage sections of the superheater and reheater of the HRSG downstream of the spray water nozzle are not being moisture laden with overspray from desuperheater cooling steam or water.

The system 100 includes integrated control of the fan, which is optimized through the use of the variable frequency drive fan, which is appropriately sized in order to provide the cooling necessary to eliminate spraying to saturation while still allowing control of the outlet steam temperature by the existing attemperator. The system 100 utilizes in depth knowledge and modeling of existing designed boiler surface areas as a basis for fan size design and control parameter selection.

The emissions of the upstream CT are unaffected by the system 100 on a pound per hour basis, other than allowing operation to occur at low loads without damage to the HRSG components. The benefit of residual superheat in the HRSG are as follows: (1) minimize water being entrained with the steam as it enters the downstream superheater and reheater sections of the HRSG causing thermal fatigue failures, (2) minimize solids in the steam leaving the superheater and reheater sections for increased purity of steam to steam turbine or process, (3) minimize creep and oxidation damage on non-pressure components in the gas stream inlet duct of the HRSG.

The air cooling system and method for a heat recovery steam generator inlet can be operated with the CT power level unaffected (e.g., 30 to 80% load, as estimated by the load curves for a GE Frame 7FA), but with a diluted exhaust temperature to the HRSG inlet. It is particularly useful with the constant temperature CTs, which maximize the temperature and control flow by manipulation of the inlet guide vanes (such as the GE 'F' class turbines).

The system 100 manipulates the inlet air dilution rate based on thermocouples added to the inlet duct of the HRSG downstream of the mixing.

The positive-sealing damper is disposed between the HRSG and the ambient air fan in order to protect equipment and personnel from backflow through the fan while the heat source is in normal operation. A pressure switch in the ambient air duct is connected to the digital electronic circuit, which sends control signals to provide positive flow or flow direction.

It is to be understood that the present invention is not limited to the embodiments described above, but encompasses any and all embodiments within the scope of the following claims.

We claim:

1. An air cooling method for a heat recovery steam generator having inter-stage attemperators and a heat recovery steam generator exhaust gas inlet accepting flow of exhaust gas from a combustion turbine, the method comprising the steps of:

beginning cooling air flow when output in megawatts from the combustion turbine is greater than 20% of full load and a combustion turbine steam set point is increasing, the cooling air flow injecting a cooling air into the combustion turbine exhaust or the heat recovery steam generator exhaust gas inlet; and terminating the cooling air flow when the combustion turbine output in megawatts is greater than 80% of full load or heat recovery steam generator exhaust gas inlet temperature is less than the steam set point plus 50° F.

2. The air cooling method according to claim 1, further comprising the step of:
varying a rate of the cooling air flow based on feedback parameters from a heat recovery steam generator exhaust gas.

3. The air cooling system according to claim 2, further comprising: a temperature controller constructed and arranged to control the heat recovery steam generator inlet gas temperature to prevent water quenching resulting from desuperheater overspray.

4. The air cooling system according to claim 1, further comprising:
a control circuit constructed and arranged to isolate a transit path of the cooling air flow from entering the heat recovery steam generator exhaust gas inlet;
a preventer constructed and arranged to prevent backflow of exhaust gases from the combustion turbine; and the control circuit being further constructed and arranged to turn off a cooling air flow source after a predetermined time delay.

* * * * *